Feb. 19, 1935.  I. HECHENBLEIKNER  1,991,745
PROCESS FOR CONCENTRATING SULPHURIC ACID AND SLUDGE ACID
Filed Sept. 25, 1929   3 Sheets-Sheet 1
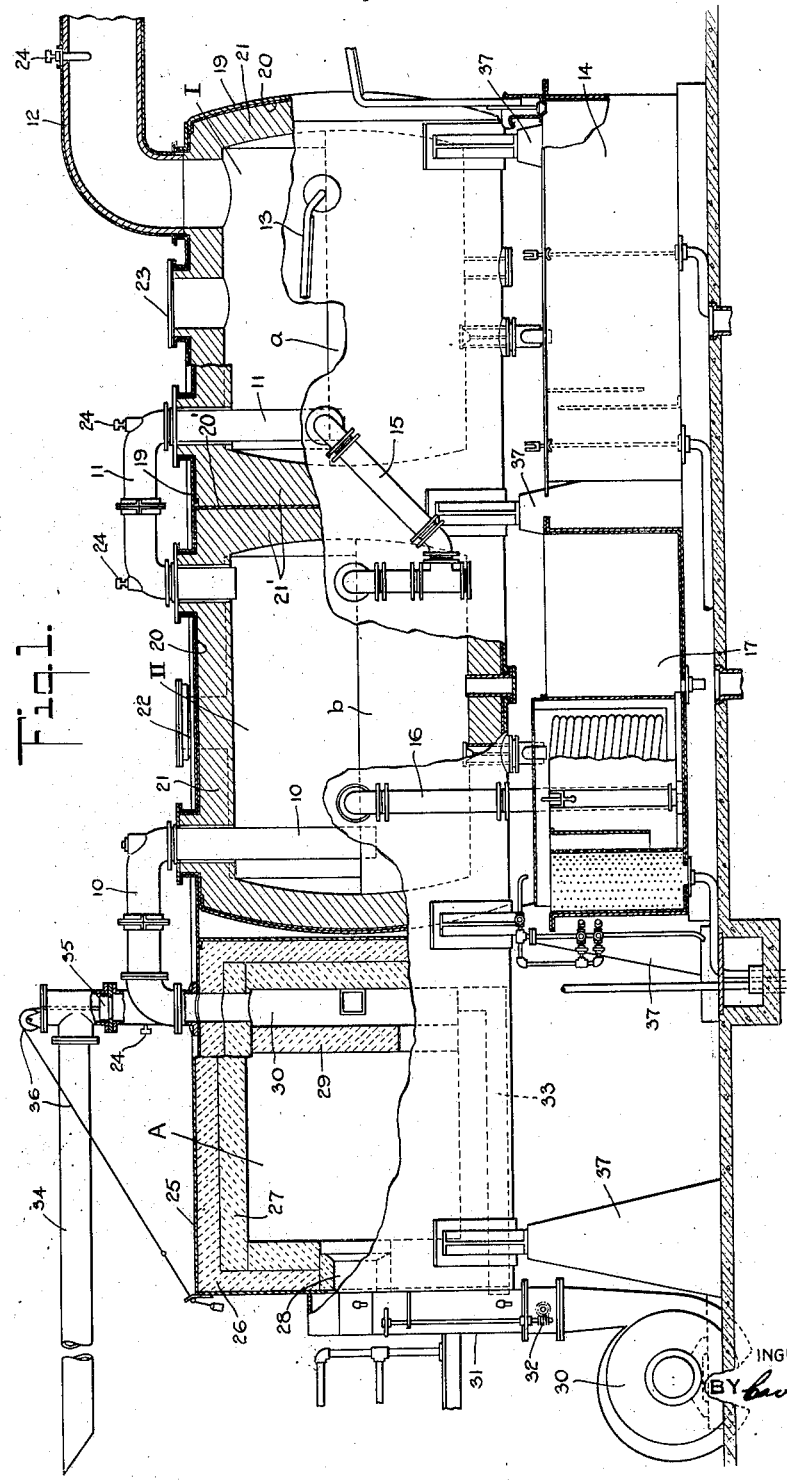
INVENTOR
INGENUIN HECHENBLEIKNER
BY
ATTORNEYS

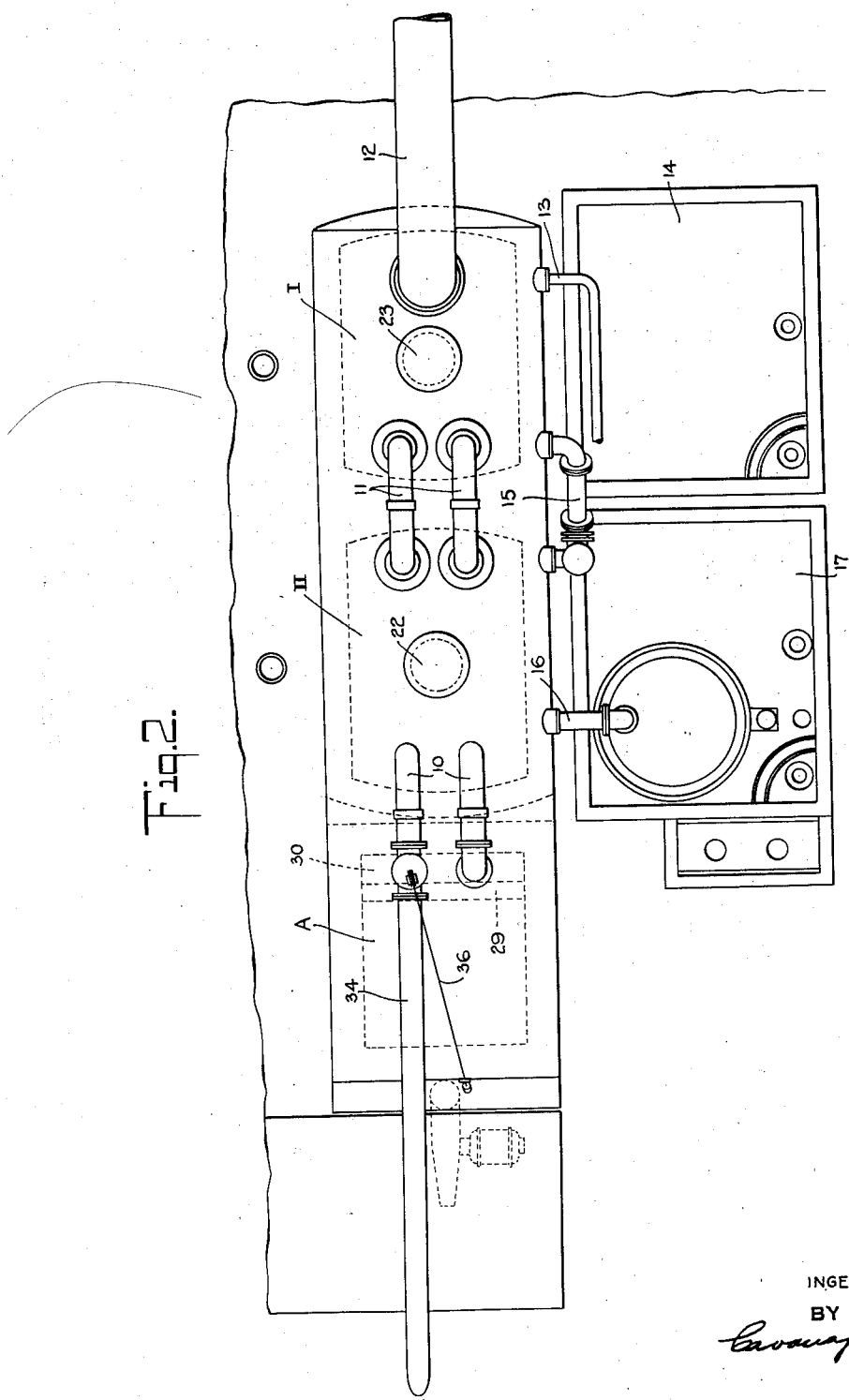

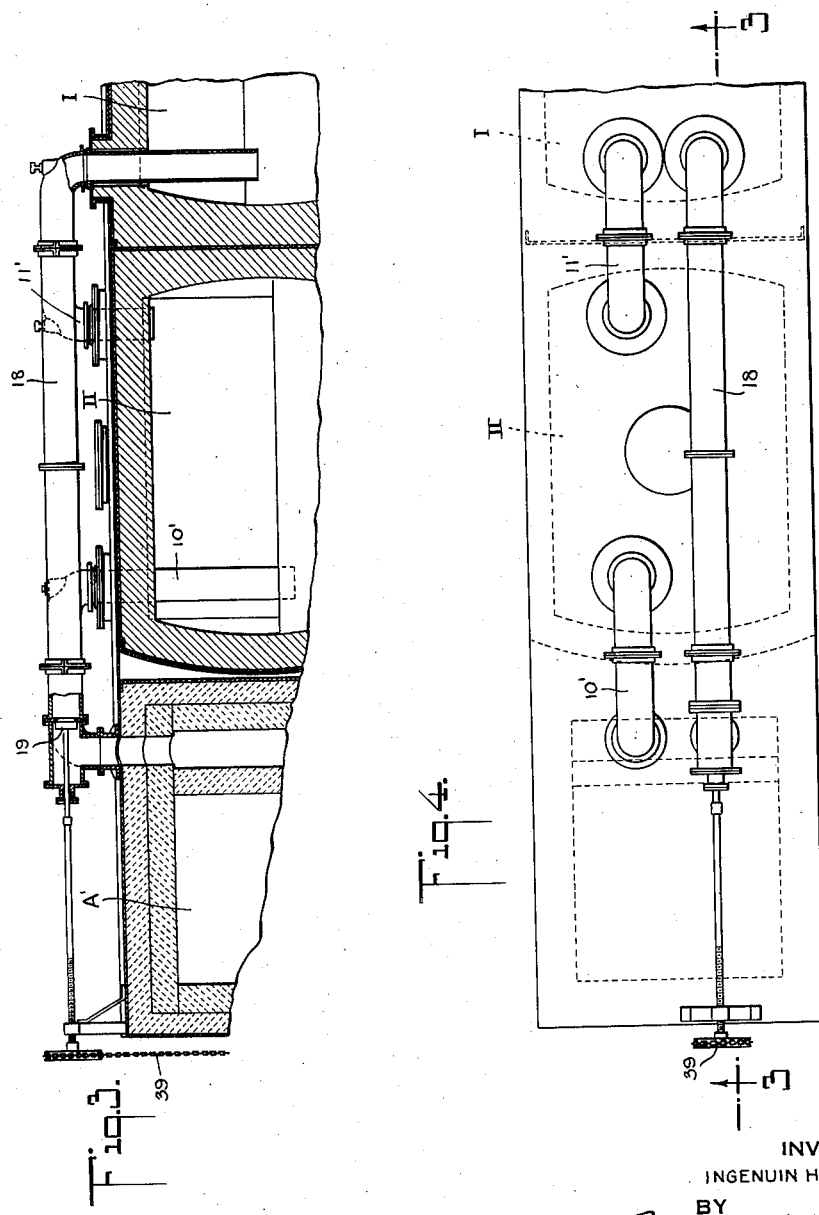

Patented Feb. 19, 1935

1,991,745

UNITED STATES PATENT OFFICE 1,991,745

PROCESS FOR CONCENTRATING SULPHURIC ACID AND SLUDGE ACID

Ingenuin Hechenbleikner, Charlotte, N. C., assignor, by mesne assignments, to Chemical Construction Corporation, a corporation of Delaware Application September 25, 1929, Serial No. 394,943

15 Claims. (Cl. 23—171)

This invention relates to the concentrating of sulphuric acid and relates more particularly to a method of treating sludge acids or separated sludge acids obtained in the refining of petroleum oils or their fractional distillates.

It is well known that crude petroleum oil or its fractional distillates is refined by subjecting the same to the action of sulphuric acid so that the latter will absorb the heavy hydrocarbons and other undesirable elements present in the crude oil. In practice the sulphuric acid so used has an initial strength of about 66 degrees Baumé or stronger, but at the completion of the operation and after the refined oil has been separated there remains a sludge or waste acid which not only contains the impurities removed from the oil, but is also of a reduced strength, usually about 50–60 degrees Baumé, due to the fact that the acid has absorbed a certain amount of water or has given up some of the SO3 contents during the refining process. This sludge acid is generally then subjected to further dilution with steam and water for recovering such oil as may remain therein, and for the purpose of relieving the acid as much as possible of its absorbed impurities. This secondary treatment results in further diluting the acid and reducing it to a strength of usually about 30 degrees Baumé, stronger acids such as California acids being reduced to a strength of about 45–50 degrees Baumé, and there also remains in the body of this separated sludge acid a considerable amount of hydrocarbons containing volatile and other organic impurities. Therefore, in order to reclaim or recover or restore the sulphuric acid from the sludge acid or the separated sludge acid and render it fit for further use, it is not only necessary to concentrate the acid for the purpose of eliminating the water and thereby raising or restoring the acid to its efficient working strength of about 66 degrees Baumé, but it is further required that the undesirable hydrocarbons which are mainly in the form of tars, asphalts, paraffins or unsaturated hydrocarbons be broken up, driven off, and otherwise eliminated.

For effectively concentrating and purifying the sludge acids a number of methods have heretofore been devised and used, prominent among which are those invented by me solely or jointly with others as set forth in the following Letters Patent to I. Hechenbleikner, No. 1,264,182, dated April 30, 1918, and to I. Hechenbleikner et al., No. 1,421,688, dated July 4, 1922. In these methods the acid is treated by blowing heated gases under pressure through a bath or body of the acid, the heating of the acid functioning to effect a concentration of the same and to eliminate organic impurities therein. In the method described and claimed in said Patent No. 1,421,688 the treatment of the sludge acid is divided into two stages, the acid body in each stage being preferably treated by blowing heated gases under pressure therethrough, the said two stages being preferably subdivided so that the acid is heated in the first stage while keeping the same below that strength at which charring or coking begins, this being determined in a practical way by the foaming point of the acid. By thus subdividing the acid treatment into these two stages it is found that the acid being concentrated is effectively purified, partial concentration and purification of the acid taking place in the first stage with completion of concentration and purification taking place in the second stage.

In the copending application of Wm. C. Mast, Serial No. 221,157, filed September 22, 1927, now Patent 1,790,507 granted January 27, 1931, reissued as 19,064, there is set forth a new and improved process for concentrating sulphuric acid which consists in sub-dividing the acid to be concentrated into a plurality of stages and in subjecting the acid in the sub-divided stages to the treatment of heated gases flowing serially through the plurality of stages delivered preferably under pressure beneath the surface of the respective acid bodies in said stages, the gases after treating the acid in one stage being delivered to the next stage for treating the acid in such next stage. This improved process is attended in practice with a number of important advantages. By causing the heated gases to flow in succession through the separate bodies of acid in the separate stages a more complete and efficient utilization of the available heat in the hot gases used for effecting the concentration, and thus a more efficient heat exchange between the heated gases and the acid bodies, is obtained. The sulphuric acid vapors distilled in a stage of higher acid concentration are entrained by the gases passing from a higher concentrated stage to a less concentrated stage, and since such gases move through the acid body in the less concentrated stage a substantial portion of the distilled sulphuric acid vapors is absorbed by the acid body in the stage of lower concentration, this permitting the eliminating of expensive absorption towers hitherto used in a multi-stage concentration process. These and other advantages not only permit the acid concentration to be carried on with greater efficiency but permit the use of an apparatus or plant occupying a substantially reduced plant space and capable of simpler handling and control, thus resulting in large economies both in the cost of plant installation and in the cost of plant upkeep.

I have discovered that the multi-stage acid concentration process and plant of the Mast invention may be very effectively used in the treatment of sludge acids or separated sludge acids embodying the generic process set forth and claimed in the aforesaid Patent No. 1,421,688 granted jointly to myself and T. C. Oliver. More particularly I have found that the Mast multi-stage process may be organized into a two-stage method for treating sludge acids or separated sludge acids, the stages being so sub-divided and inter-related as to permit the effective concentration and the efficient purification of the sludge acids and so as to afford the securing of many of the advantages and improvements flowing from and inherent in the Mast concentration plant. One of the prime objects of my present invention therefore centers about the provision of a two-stage method of treating sludge acids utilizing the Mast process. Improvements in the two-stage process of my present invention may also be used in the concentration of sulphuric acid where no purification is required; and a further object of my present invention therefore resides more broadly in the provision of a plural stage sulphuric acid concentrating process embodying these improvements.

In applying the Mast sulphuric acid concentration process to the treatment of sludge acids a number of problems are met with, these problems arising from the relation between the stages of the acid treatment system and the relation between this system and the scrubbing system such as the Cottrell precipitator usually associated therewith. I have found that in sub-dividing the process into the two stages that the concentration strength of the feed acid flowing from the first or lower concentration stage to the second or higher concentration stage should be predetermined so that, on the one hand, it should be sufficiently high to prevent over-loading of acid condensate in the precipitator and, on the other hand, it should be sufficiently low to avoid or prevent foaming from taking place in the first concentrating stage. If this feed acid flowing into the second stage be relatively weak the large amount of air required for the removal of the water in the acid when forced through the acid of the second stage distills an enormous quantity of $SO_3$, thus increasing the work of the precipitator. This results in a large quantity of condensate, reduction in plant capacity and high fuel and power consumption, and causes much arcing in the precipitator and the loss of some acid mist from the precipitator exit which is highly detrimental to the steel work of the precipitator and adjoining buildings. If, on the other hand, this feed acid flowing into the second stage is too strong, insufficient purification of the sludge acid takes place accompanied by undesirable foaming of the acid in the first stage. It is therefore necessary or highly desirable to inter-relate the two stages of the process by predetermining the concentration of the feed acid which moves from the first to the second stage. Sludge acids or separated sludge acids used in the treatment, however, differ in initial or starting strengths depending upon the particular sludge acid used. Thus some separated sludge acids may have a strength as low as 30 degrees Baumé while others may have a strength as high as 51 degrees Baumé. This variable in the initial strength of the particular sludge acid to be concentrated and purified adds an additional factor to the problem where the concentration of the feed acid flowing into the second stage should be predetermined, as I have found, between the upper limit imposed by the foaming point of the first stage and the lower limit imposed by the desideratum of avoiding too large an acid distillation in the second stage and a consequent over-loading of the precipitator. This large variable in the initial strengths of the separated sludge acids which may be used in a given plant, when related to the lesser variable of the permissible range of strengths of the feed acid flowing from the first to the second stage, requires that with some sludge acids the first stage acts principally as a preheater and absorber with a relatively small amount (if any) of concentration taking place therein, while with other sludge acids a substantial amount of concentration takes place in the first stage. Another factor which enters the problem is that of the amount of absorption which may be made to take place in the first stage, since a relatively strong acid in the first stage absorbs more of the sulphuric acid carried over from the second stage into the first stage than would a weaker acid in the first stage; and it is therefore desirable to have a relatively strong acid in the low stage of the process so that the absorption of the $H_2SO_4$ driven over from the high stage may be better or greater. More specific prime objects of my present invention contemplate, therefore, the solution of these problems and the resulting provision of a multi-stage or two-stage process especially intended for reclaiming sludge acids, a number of the improvements of which however are adaptable and intended for use for concentration of sulphuric acid where no problem of purification arises.

To the accomplishment of the foregoing and to the attaining of such other objects as may hereinafter appear, my invention consists in the processes and steps as hereinafter particularly described and sought to be defined in the claims, reference being had to the accompanying drawings which show plants which may be used in the carrying out of the process, and in which:

Fig. 1 is a vertical elevational view with parts shown in cross-section of a sludge acid recovery plant carrying out the process of the invention;

Fig. 2 is a plan view thereof; and

Figs. 3 and 4 are views of modifications thereof showing a preferred manner of practicing the process, Fig. 3 being an elevational view of a part of the system with parts shown in section, and Fig. 4 being a plan view of Fig. 3.

Referring now more in detail to the drawings and having reference first to the plant or apparatus shown in Figs. 1 and 2 thereof, the process of the invention consists in sub-dividing the acid to be treated into two separate bodies $a$ and $b$ constituting two stages I and II respectively, in subjecting the acid bodies $a$ and $b$ in the two stages to the treatment of heated gases flowing in succession through the acid bodies in said stages, in feeding the treated acid of the first stage I into the second stage II, the gases after treating the acid body $b$ in stage II being delivered to stage I for treating the acid in such stage. The heated gases generated preferably as combustion gases in a furnace A are first delivered preferably under pressure to the stage II beneath the surface of the acid body $b$ therein by means of conduits 10, two of which are shown connecting the furnace A to the stage II, the said gases after treating the acid body $b$ being then delivered from above the acid body $b$ to the stage I and beneath the surface of the acid body $a$ therein by means of conduits 11, two of which are shown connecting the stages I and II, the spent gases after treating the acid body $a$ being then withdrawn from the stage I though the exit flue 12, the said exiting gases being then delivered to an absorption system such as a Cottrell precipitator. The acid is fed in a continuous stream into the stage I, the acid being introduced through a feed acid inlet 13 communicating with a weak acid tank 14, the level of the acid body in the stage I being placed at an elevation above the acid level of the stage II so that the acid continuously flows by gravity on the overflow principle from the stage I to the stage II, this flow taking place through the communicating piping 15, the completely treated acid body $b$ of the stage II then flowing from this stage through the overflow duct 16 into an acid cooling apparatus and tank 17.

As set forth in the said Mast patent and reissue, an acid concentration system in which the acid body to be treated is thus sub-divided into separate stages and the separate acid bodies submitted to the treatment of heated gases flowing in succession through the acid bodies is attended in practice with a number of important advantages, a more complete and efficient utilization of the available heat in the heated gases and hence a more efficient heat exchange being obtained, and an efficient substantial absorption of sulphuric acid vapors distilled in the process being capable of being effected in the concentration system. I have found that this multi-stage process may be organized into a two-stage method for effectively treating sludge acids or separated sludge acids, the two stages hereinbefore referred to as stages I and II being so sub-divided and inter-related as to permit the effective concentration and the desired purification of the sludge acids, and so as to afford the obtaining of the advantages and improvements flowing from and inherent in the Mast process. More particularly, I have determined that for sludge acids of any of a variety of initial strengths the two stages may be properly inter-related to effect the desired concentration and purification. This is carried out by predetermining the concentration of the weak feed acid flowing from the first stage I to the second stage II (within a permissible range of strengths) and by correspondingly suitably predetermining the entrant and exit temperatures of the combustion gases. In the preferred practice of the process the heated gases from the combustion furnace enter the acid of stage II at about 1100° F. and leave the acid in said stage II at a temperature of about 10 or 15 degrees higher than the temperature of the acid body $b$ in said stage; and when making 66 degree Baumé acid the gases leave the stage II and enter the stage I at about 415° F., the gases passing through the acid body $a$ in the stage I being further cooled to a temperature slightly above the temperature of the acid body $a$ in said stage. By regulating or controlling the entrant and exit temperatures in this way completion of acid concentration takes place in stage II, stage I functioning also as a pre-concentrator, depending upon the initial strengths of the weak feed acid introduced in the first stage I.

For carrying out the purification of the sludge acids in the desired manner it is requisite or preferable to predetermine the concentration of the feed acid flowing into the second stage II. As heretofore pointed out, if this feed acid flowing into the second stage be relatively weak the precipitator is disadvantageously overloaded and other objections result; and if, on the other hand, this feed acid is too strong insufficient purification of the sludge acid takes place accompanied by undesirable foaming in the first stage. Without further modification the system or plant shown in Figs. 1 and 2 of the drawings produces different strengths of concentration of the feed acid flowing into stage II, depending upon the initial strength of the weak feed acid flowing into the stage I. For example, the following table gives the relations between the acid strengths of the acid bodies $a$ and $b$ in both stages and the entrant and exiting temperatures:

| Stage I | | | Stage II | | |
| --- | --- | --- | --- | --- | --- |
| Feed acid Bé. | Acid Bé. | Exit temperature degrees F. | Acid Bé. | Exit temperature degrees F. | Entrant temperature degrees F. |
| 33 | 38 | 210 | 66 | 415 | 1100 |
| 40 | 43 | 220 | 66 | 415 | 1100 |
| 46 | 47.2 | 235 | 66 | 415 | 1100 |
| 50.5 | 51.5 | 256 | 66 | 415 | 1100 |

From this table it will be seen, first, that there is an excellent heat exchange taking place in the system and very little heat escapes with the gases exiting from stage I. It will be noted that for sludge acids of relatively higher initial strengths such as 50.5 degrees Baumé the stage I acts mainly as preheater and absorber with only a small amount of concentration, while with relatively low initial strengths such as 33 degrees Baumé the low stage unit (stage I) acts to effect a greater amount of concentration, although it will be seen that the feed acid flowing from the stage I into the stage II is much lower for the second case taken than for the first case referred to, it being 38 degrees Baumé for the 33 degree Baumé initial weak feed acid as against 51.5 degree Baumé for the 50.5 degree Baumé initial weak feed acid. I have found that, to meet the problems heretofore discussed affecting purification and concentration of the sludge acids and the operating characteristics of the plant as a whole including the operation of the precipitator, the feed acid flowing into the stage II should be close to the upper range given in the aforesaid table and should be preferably about 52 degrees Baumé. The system shown in Figs. 1 and 2 therefore works best where the weak feed acid strength flowing into the stage I is high, stage I then acting mainly as a preheater and absorber with a small amount of concentration taking place therein. Where, however, the initial strength of the separated sludge acid introduced into the system is in the lower part of the range given in the above table, I have found that additional means should be provided for effecting a concentration of the acid in stage I up to preferably the said acid strength of about 52 degrees Baumé, and this additional means is shown in the modified form of the plant depicted in Figs. 3 and 4 of the drawings. I have found, however, that the plant of Figs. 1 and 2 of the drawings may, if desired, be employed with sludge acids of the lower initial strengths but this leads to the disadvantages hereinabove discussed which center about the resulting increased distillation of acid which takes place in the system and decreased absorption of the same by the acid in the first stage.

In Figs. 3 and 4 of the drawings I show a modification of the plant in which there is incorporated means for additionally subjecting the acid body in the first stage of the system to treatment for effecting the desired pre-concentration of the acid in said first stage, this being obtained by subjecting the acid body in the first stage to the treatment of heated gases introduced and flowing directly into the acid body of such first stage. In the system shown in Figs. 3 and 4 the furnace A' and the stages I and II are interconnected by communicating conduits 10' and 11' in the same manner as shown for Figs. 1 and 2 of the drawings for the flow of combustion gases moving in succession through the stages of the system as hereinbefore described; and for effecting the pre-concentration of the acid in the first stage up to the desired strength the furnace A' is connected directly to the stage I by means of a conduit 18, this conduit conducting combustion gases from the furnace A' directly into the stage I, it being understood that this conduit extends to a region below the acid level in said stage so that the gases are caused to bubble through the acid body in this stage. This direct gas flow may be regulated by a plug damper 19 which may control the amount of gases passing directly into this stage I.

The functioning of the two stages of the system may be considered by an analysis of the separate functions of the gas flow moving serially or in succession through the stages, and which may be briefly referred to as the serial gas flow and the gas flow introduced directly into the first stage which may be briefly termed the supplemental gas flow. As aforedescribed, the first stage I acts, by virtue of the heated gases of the serial gas flow, as a preheater and absorber with some, if any, concentration taking place, these gases acting in the stage II as a concentrator and in both stages for purification. The supplemental gas flow acts only on stage I and these gases coming directly from the furnace and being of a temperature higher than those delivered from the stage II act on the acid body in stage I for pre-concentrating the same up to the desired strength. This desired strength should be about 52 degrees Baumé for any of a variety of sludge acids and should more generally be sufficiently low to avoid foaming in the first stage and sufficiently high to minimize acid distillation in the second stage and in the system. It is known that a given quantity of acid will be distilled from the acid body when concentrating the same to any point above 60 degrees Baumé; and as the distillation does not actually start until this strength of acid is reached, it means that the least amount of distillation takes place when feeding 60 degrees Baumé acid into the second stage; and as this feed acid is made weaker (below 60 degrees Baumé) the amount of acid distilled off will be increased in proportion to the amount of water to be driven off. It is this increase in the distillation which produces the disadvantageous results hereinabove outlined. This separation between the two stages by the feed acid concentration point of 60 degrees Baumé is, however, undesirable where purification is desired to be effected, since it is generally too high above the foaming point of the acid. To effectively solve the problem of purification the feed acid in the second stage should be substantially below this strength of 60 degrees Baumé, but when it is dropped too far below this value excessive distillation of the acid and consequent overloading of the precipitator takes place. Moreover, if the acid in the first stage is of too low a concentration, inadequate absorption of the distilled acid fumes takes place. For these reasons I have found that a strength of 52 degrees Baumé for the acid bath in the first stage satisfies the requirement or desideratum that the concentration should be sufficiently low to avoid foaming in stage I and sufficiently high to minimize acid distillation in stage II. With this division between the two stages a relatively high strength of acid in stage I absorbs the acid fumes entrained in the serial gases delivered from stage II and these gases function to preheat the acid body $a$, thus effecting the desired heat exchange. These serial gases in stage II concentrate the acid to the desired strength (66 degrees Baumé) and entrain the fumes distilled in stage II, carrying these fumes directly into the acid body $a$ of stage I where they are for the most part absorbed, the acid strength in the first stage being thus sufficiently high to effect a substantial absorption. The supplemental gases flowing directly into the first stage act to produce the pre-concentration to the desired strength, and it will be noted that these gases do not distill any acid fumes from the acid in stage I by reason of the fact that the concentration of the acid bath in stage I is below 60 degrees Baumé, and thus the introduction of these hotter gases into the first stage is not accompanied by any increase in acid distillation and does not add to the loading of the precipitator.

The process may be carried out in a single horizontal cylindrical or drum-shaped steel tank lined with lead and acid resisting brick and partitioned into the two stages or compartments referred to. The use of cylindrical or drum-shaped tanks lined with lead and acid proof brick is of particular advantage since the cylindrical construction maintains the bricks tightly in position at all times and prevents checks and leakage of acid and fumes which is inherent in other types of concentrating plants. Furthermore, these tanks will last practically indefinitely and minimize the maintenance costs. The apparatus shown in Figs. 1 and 2 comprises a horizontal cylindrical or drum-shaped steel tank 19 provided with an inner lead lining 20 and also with a lining 21 of acid proof masonry, said acid proof masonry being laid up on layers of asbestos board soaked with silicate of soda which is laid against all of the lead surfaces before the laying of the acid proof masonry. The cylindrical tank is divided by part of the masonry 21' and by a lead sheet 20' which forms a partition into the two chambers or compartments which provide the stages I and II. These compartments may be provided with the manholes 22 and 23 formed in the concentrating drum structure, which drum structure is further designed to receive in seal proof manner the gas conduits 10 and 11 and the gas exit flue 12, suitable provision being also made therein for the acid inlet and outlet conduits 13, 15 and 16. Suitable provision may be made for determining the temperatures throughout as by means of pyrometers 24, 24 located at various points in the gas flow, as shown.

The furnace A may be of any suitable construction. As shown, this furnace is built to provide an outer steel shell 25 lined interiorly with layers of insulating brick 26 which in turn is lined with fire brick 27, the furnace being provided with the usual burner means (not shown) at the burner opening 28 thereof, a deflector wall 29 being provided for deflecting the combustion gases away from the passage or flue 30 for the combustion gases formed in the furnace. Air under pressure for the combustion gases is provided by the blower 30' which communicates by means of the conduit 31 with the furnace, the air, if desired, being controlled by means of a butterfly damper structure 32. The temperature of the combustion gas mixture may be controlled by providing a cold air duct or bypass 33 connecting the conduit 31 with the combustion gas passage or flue 30. One of the gas conduits 10 may be provided also with a starting up stack 34 connected thereto, the valve 35 of which may be controlled by means of the pulley and cord combination 36. The furnace and the acid compartments may comprise a single steel drum suitably supported on pedestal foundations 37, 37.

The gas conduits 10 and 11 extend to a suitable depth below the normal acid levels in the chambers I and II and are, as is manifest, open at their lower ends. The pressure provided by the blower 30 yields the pressure desired for causing the gases to flow through the stages and through the acid bodies therein. For delivering the gases from stage II to stage I the conduits 11, 11 connect the stages I and II, one of the ends of these conduits extending into stage II above the acid level therein and the other of the ends of these conduits extending into stage I below the acid level therein. The gas exit flue 12 leads from the top of the chamber of stage I to suitable apparatus for recovering the acid mist or vapors such as a Cottrell precipitator. The overflow acid conducting structure 15 comprises preferably a U trap connecting stage I to stage II so that a gravity flow of the acid from the first stage to the second stage, as heretofore described, is permitted. This U trap is desirable since were the acid from stage I to enter stage II below the acid level therein foaming in the connecting pipe takes place, and since if the connection is made to a point above the acid level in stage II the pressure exerted in the strong acid stage is too great and sets up too large a head in the low strength acid stage.

The apparatus shown in Figs. 3 and 4 of the drawings is constructed in a manner similar to the apparatus shown in Figs. 1 and 2 of the drawings. The additional conduit 18 for the auxiliary gas flow is provided, as stated, with the plug damper 19 which may be regulated by adjusting the screw rod 38 attached thereto which in turn may be operated by a chain and sprocket 39.

The manner of carrying out the process of the invention will be apparent from the above detailed description thereof. For the plant of Figs. 1 and 2 of the drawings the hot combustion gases produced under pressure in the furnace A are first delivered at suitable pressure and at a temperature of about 1100° F. to the higher concentration stage II through conduits 10, the gases being introduced into the acid bath $b$ at a region below the said level of the bath. In bubbling up through this body or bath of acid the gases agitate and heat the same and carry off water vapor therefrom together with some of the distilled $H_2SO_4$ fumes. These gases are then delivered from above the acid level in stage II by means of the conduits 11 to the stage I and are introduced into the bath $a$ therein below the acid level of said bath, the gases entering the bath $a$ at about the temperature of 415° F. The gases preheat the acid body $a$ and may effect a preconcentration thereof, the final heat exchange taking place in this stage I, the spent gases exiting from this stage through the flue 12 and to the precipitator. The relatively cooler acid bath $a$, particularly when of a substantial strength, functions to absorb the acid fumes carried over from the stage II. A continual flow of acid is maintained through the stages in a direction reverse to the gas flow therein, the rate of such acid flow being controlled by the rate at which dilute acid is supplied through the feed acid inlet 13. The process is thus continuous both for the acid flow and the gas flow. By subdividing the process into two stages and predetermining the temperatures of the gas flow, as described, and by providing the auxiliary gas path in a plant of the apparatus shown in Figs. 3 and 4 of the drawings employable for initial acid strengths of any of a substantial range, the strength of the feed acid flowing into the second stage may be made of the desired concentration sufficiently low to avoid foaming in the first stage and sufficiently high to minimize acid distillation in the second stage and in the system, resulting in all of the advantages set forth. A further advantage of this invention is the absence of exposure of a small stream of acid to gases of high temperature or to highly heated checker work structures as is the case in the ordinary tower process. The tower usually employed in such process consists of a checker work of acid proof brick and a relatively small stream of acid is allowed to flow downwardly through such checker work while the hot gases pass upwardly therethrough. The acid flow is frequently irregular in different parts of the tower and portions of the checker work often become overheated so that when acid is again brought into contact therewith decomposition results. This decomposition is therefore substantially eliminated by the practice of the present invention without the use of a tower. Other advantages of the process reside in the possibility of similarly treating in the same apparatus sludge acids of different initial strengths and in the production of uniform results with different sludge acids. Still other advantages reside in the elimination of the other troubles referred to incident to overloading the precipitator.

It will be apparent that while I have shown and described my invention in the preferred forms, many changes and modifications may be made in the structure disclosed without departing from the spirit of the invention, defined in the following claims.

I claim:

1. The method of treating sludge acids which consists in sub-dividing the acid into two bodies constituting two stages, in feeding the treated acid of the first stage into the second stage for concentration therein, and in subjecting the acid in the two stages to the treatment of heated gases flowing in succession through the acid bodies in the two stages, the gases delivered to the second stage having a temperature of the order of 1100 degrees F. and said gases after treating the acid body in said second stage being delivered to the first stage at a temperature of the order of 400 degrees F. for treating the acid body therein.

2. The method of treating sludge acids which consists in sub-dividing the acid into two separate bodies constituting a system of two stages, in feeding the treated acid of the first stage into the second stage for concentration therein, in maintaining the feed acid of the second stage at a predetermined concentration which will avoid foaming in the first stage and minimize acid distillation in the second stage and in the system, and in subjecting the acid in two stages to the internal heat treatment of heated gases flowing seriatim through the acid bodies in the two stages, the gases after treating the acid body in the second stage being delivered to the first stage for treating the acid body therein.

3. A method of concentrating sulphuric acid which consists in sub-dividing the acid into two separate bodies constituting two stages, in feeding the treated acid of the first stage into the second stage for concentration therein, in maintaining the feed acid of the second stage at a concentration sufficiently high to reduce acid distillation in the second stage and in the system to a small percentage of the finished acid, and in subjecting the acid in the two stages to the internal heat treatment of heated gases flowing seriatim through the acid bodies in the two stages, the gases after treating the acid body in the second stage being delivered to the first stage for treating the acid body therein.

4. The method of treating sludge acids which consists in sub-dividing the acid into two separate bodies constituting two stages, in feeding the treated acid of the first stage into the second stage for concentration therein, in maintaining the feed acid of the second stage at a predetermined concentration which will avoid foaming in the first stage and minimize acid distillation in the second stage, and in subjecting the acid in the two stages to the internal heat treatment of heated gases flowing seriatim through the acid bodies in the two stages, the gases being conducted from above the surface of the acid in the second stage to below the surface of the acid in the first stage.

5. The method of treating sludge acids which consists in sub-dividing the acid into two separate bodies constituting two stages, in feeding the treated acid of the first stage into the second stage for concentration therein, in maintaining the feed acid of the second stage at a concentration generally of the order of 52 degrees Baumé so as to avoid foaming in the first stage and to minimize acid distillation in the second stage, and in subjecting the acid in the two stages to the internal heat treatment of heated gases flowing seriatim through the acid bodies in the two stages, the gases after treating the acid body in the second stage being delivered to the first stage for treating the acid body therein, the acid in the second stage being concentrated to 66 degrees Baumé.

6. The method of treating sludge acids which consists in sub-dividing the acid into two separate bodies constituting two stages, in feeding the treated acid of the first stage into the second stage for concentration therein, in maintaining the feed acid of the second stage at a predetermined concentration which will avoid foaming in the first stage and minimize acid distillation in the second stage, and in subjecting the acid in the two stages to the treatment of heated gases flowing seriatim through the acid bodies in the two stages, the gases delivered to the second stage having a temperature of the order of 1100 degrees F. and said gases after treating the acid body in the second stage being delivered to the first stage at a temperature of the order of 400 degrees F. for treating the acid body therein.

7. The method of concentrating sulphuric acid which consists in sub-dividing the acid into a plurality of separate bodies constituting a plurality of stages, in feeding the treated acid of one stage into the next of the stages, in subjecting the acid bodies in the separate stages to the treatment of heated gases flowing in succession through the acid bodies in a plurality of the stages, the gases after treating the acid body in one stage being delivered to the next stage for treating the acid in such next stage, and in additionally subjecting the acid body in such next stage to the treatment of heated gases introduced and flowing directly into the acid body of such next stage.

8. The method of concentrating sulphuric acid which consists in sub-dividing the acid into a plurality of separate bodies constituting a plurality of stages, in feeding the treated acid of one stage into the next of the stages, in subjecting the acid bodies in the separate stages to the treatment of heated gases flowing in succession through the acid bodies in a plurality of the stages, the gases after flowing through and treating the acid body in one stage being delivered from above the acid level in said stage to the next stage below the acid level therein for treating the acid in such next stage, and in additionally subjecting the acid body in such next stage to the treatment of heated gases introduced and flowing directly into the acid body of such next stage and below the acid level therein.

9. The method of concentrating sulphuric acid which consists in sub-dividing the acid into two separate bodies constituting two stages, in feeding the treated acid of the first stage into the second stage, in subjecting the acid bodies in the two stages to the treatment of heated gases flowing in succession through the acid bodies in said stages, the gases after treating the acid body in the second stage being delivered to the first stage for treating the acid in such first stage, and in additionally subjecting the acid body in such first stage to the treatment of heated gases introduced and flowing directly into the acid body of such first stage.

10. The method of concentrating sulphuric acid which consists in sub-dividing the acid into two separate bodies constituting two stages, in feeding the treated acid of the first stage into the second stage, in subjecting the acid bodies in the two stages to the treatment of heated gases flowing in succession through the acid bodies in said stages, the gases delivered to the second stage having a relatively high temperature and said gases after treating the acid body in the second stage being delivered to the first stage at a relatively lower temperature for treating the acid in such first stage, and in additionally subjecting the acid body in such first stage to the treatment of heated gases having a relatively high temperature introduced and flowing directly into the acid body of such first stage.

11. The method of treating sludge acids which consists in sub-dividing the acid into two separate bodies constituting two stages, in feeding the treated acid of the first stage into the second stage for concentration therein, and in subjecting the acid bodies in the two stages to the treatment of heated gases flowing in succession through the acid bodies in the two stages, the gases after treating the acid body in the second stage being delivered to the first stage for treating the acid body therein, and in additionally subjecting the acid body in the first stage to heated gases delivered directly into the acid body of said first stage.

12. The method of treating sludge acids which consists in sub-dividing the acid into two separate bodies constituting two stages, in feeding the treated acid of the first stage into the second stage for concentration therein, in maintaining the treated acid in the first stage at a concentration below the foaming point of the acid, and in subjecting the acid bodies in the two stages to the treatment of heated gases flowing in succession through the acid bodies in the two stages, the gases after treating the acid body in the second stage being delivered from above the acid level therein to the first stage for treating the acid body therein, and in additionally subjecting the acid body in the first stage to heated gases delivered directly into the acid body of said first stage.

13. The method of treating sludge acids which consists in sub-dividing the acid into two separate bodies constituting two stages, in feeding the treated acid of the first stage into the second stage for concentration therein, and in subjecting the acid bodies in the two stages to the treatment of heated gases flowing in succession through the acid bodies in the two stages, the gases delivered to the second stage having a temperature of the order of 1100 degrees F. and said gases after treating the acid body in the second stage being delivered to the first stage at a temperature of the order of 400 degrees F. for treating the acid body therein, and in additionally subjecting the acid body in the first stage to heated gases at a temperature substantially higher than 400 degrees F. delivered directly into the acid body of said first stage.

14. The method of treating sludge acids which consists in sub-dividing the acid into two separate bodies constituting two stages, in feeding the treated acid of the first stage into the second stage for concentration therein, and in subjecting the acid bodies in the two stages to the treatment of heated gases flowing in succession through the acid bodies in the two stages, the gases delivered to the second stage having a relatively high temperature and said gases after treating the acid body in the second stage being delivered to the first stage at a relatively lower temperature for treating the acid body therein, and in additionally subjecting the acid body in the first stage to heated gases having a relatively high temperature delivered directly into the acid body of said first stage.

15. The method of treating sludge acids which consists in sub-dividing the acid into two separate bodies constituting two stages, in feeding the treated acid of the first stage into the second stage for concentration therein, in maintaining the feed acid of the second stage at a concentration sufficiently low to avoid foaming in the first stage and sufficiently high to minimize acid distillation in the second stage and in the system, and in subjecting the acid bodies in the two stages to the treatment of heated gases flowing in succession through the acid bodies in the two stages, the gases after treating the acid body in the second stage being delivered to the first stage for treating the acid body therein, and in additionally subjecting the acid body in the first stage to heated gases delivered directly into the acid body of said first stage.

INGENUIN HECHENBLEIKNER.